US012462314B2

(12) United States Patent
Gebhardt et al.

(10) Patent No.: US 12,462,314 B2
(45) Date of Patent: *Nov. 4, 2025

(54) METHODS AND SYSTEMS FOR MEETING RAPIDLY FLUCTUATING POWER DEMANDS USING INTERRUPTIBLE LOAD AND STABLE POWER PRODUCTION

(71) Applicant: Gebhardt Enterprises, LLC, Houston, TX (US)

(72) Inventors: Eric Gebhardt, Houston, TX (US); Scott Hoyte, Marietta, GA (US)

(73) Assignee: Gebhardt Enterprises, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,439

(22) Filed: Nov. 10, 2023

(65) Prior Publication Data

US 2024/0078619 A1    Mar. 7, 2024

Related U.S. Application Data

(63) Continuation of application No. 16/816,125, filed on Mar. 11, 2020, now Pat. No. 11,854,096.

(51) Int. Cl.
*G06Q 50/06* (2024.01)
*G05B 13/02* (2006.01)
(Continued)

(52) U.S. Cl.
CPC ........... *G06Q 50/06* (2013.01); *G05B 13/027* (2013.01); *G05B 13/041* (2013.01);
(Continued)

(58) Field of Classification Search
CPC .... G06Q 50/06; G06Q 20/065; G06Q 20/381; G06Q 30/0206; G06Q 30/018; G06Q 2220/00; G05B 13/027; G05B 13/041
(Continued)

(56) References Cited

U.S. PATENT DOCUMENTS 7,385,373 B2    6/2008  Doruk et al.
10,180,668 B2   1/2019  Hong
(Continued)

OTHER PUBLICATIONS

"Energy consumption of cryptocurrency mining: A study of electricity consumption in mining cryptocurrencies" Published by Elsevier (Year: 2019).*

*Primary Examiner* — Zeina Elchanti
(74) *Attorney, Agent, or Firm* — Finnegan, Henderson, Farabow, Garrett & Dunner LLP

(57) ABSTRACT

An automated control method for meeting rapidly fluctuating power demands with stable power production is disclosed. The method includes determining a market value of a unit of electricity sold on the grid, a fuel cost required to produce the unit of electricity, and a market value of a processing task requiring the unity of electricity. The method also includes calculating which of the electricity, processing, or fuel, is the most valuable; shutting off a running process when the value of the electricity is highest or the value of the fuel is highest; and starting a pending process when the net market value of the processing task is highest. The method may also include reducing electricity generation at a power plant when the value of electricity is negative, or exercising a futures contract to supply electricity.

16 Claims, 5 Drawing Sheets

(51) Int. Cl.
  *G05B 13/04* (2006.01)
  *G06Q 20/06* (2012.01)
  *G06Q 20/38* (2012.01)
  *G06Q 30/0201* (2023.01)
  *G06Q 30/018* (2023.01)

(52) U.S. Cl.
  CPC ......... *G06Q 20/065* (2013.01); *G06Q 20/381* (2013.01); *G06Q 30/0206* (2013.01); *G06Q 30/018* (2013.01); *G06Q 2220/00* (2013.01)

(58) Field of Classification Search
  USPC ....................................................... 705/7.35
  See application file for complete search history.

(56) References Cited

U.S. PATENT DOCUMENTS

| | | |
|---|---|---|
| 10,367,353 B1 | 7/2019 | McNamara et al. |
| 10,444,818 B1 | 10/2019 | McNamara et al. |
| 10,452,127 B1 | 10/2019 | McNamara et al. |
| 10,608,433 B1 | 3/2020 | McNamara et al. |
| 10,873,211 B2 | 12/2020 | McNamara et al. |
| 11,016,456 B2 | 5/2021 | Henson et al. |
| 11,016,553 B2 | 5/2021 | McNamara et al. |
| 11,025,060 B2 | 6/2021 | McNamara et al. |
| 11,031,813 B2 | 6/2021 | McNamara et al. |
| 11,594,888 B2 | 2/2023 | McNamara et al. |
| 11,650,639 B2 | 5/2023 | McNamara et al. |
| 11,669,144 B2 | 6/2023 | McNamara et al. |
| 11,682,902 B2 | 6/2023 | McNamara et al. |
| 12,021,385 B2 | 6/2024 | McNamara et al. |
| 12,067,633 B2 | 8/2024 | McNamara et al. |
| 2017/0358041 A1* | 12/2017 | Forbes, Jr. ............... G05D 3/12 |
| 2018/0264347 A1 | 9/2018 | Tran et al. |
| 2021/0035242 A1 | 2/2021 | McNamara et al. |

\* cited by examiner

METHODS AND SYSTEMS FOR MEETING RAPIDLY FLUCTUATING POWER DEMANDS USING INTERRUPTIBLE LOAD AND STABLE POWER PRODUCTION

CROSS-REFERENCE TO RELATED PATENT APPLICATION

This application is a Continuation Application of U.S. patent application Ser. No. 16/816,125, filed Mar. 11, 2020, which is incorporated herein by reference in its entirety.

TECHNICAL FIELD

The present disclosure relates to the field of management of electric power production, and, more particularly, methods and systems for rapidly responding to changes in electrical load demand by providing flexible electrical consumption providing economic benefit to the power generation facility.

BACKGROUND

Management of electric power production by traditional power plants has become increasingly complex due to the rise in use of renewable energy sources. Although electricity demand by consumers may be modeled based on historical analysis of consumer activity, production of renewable energy is difficult to predict. For example, the presence of a cloud over a solar power farm or wind gusting through a wind power farm may cause rapidly fluctuations in electric power production. Production may decrease or increase by megawatts in a few minutes. Additionally, solar power generation is highest during mid-day, while wind power generation may be higher during day or night depending on location. Electric power demand, in contrast, sharply increases when workers return to their homes in the evening, just as renewable sources are decreasing production. Thus, renewable power generation may be variable and not coincide with demand.

In order to meet this rapid demand increase coupled with rapid renewable production decrease that occurs in the evenings, operators of traditional power plants, such as coal and gas turbine generators, must quickly ramp up production using non-renewable sources. The startup phase of operating traditional generators is relatively more costly than baseline production, and often results in more pollution than if operators allowed the generator to run at a higher capacity utilization rate throughout the day. Cutting production during daytime also reduces the overall capacity utilization of the power plant, reducing economic incentives to build new plants and also extending the payback period and return on investment.

Alternatively, traditional power plants may operate at full capacity throughout the day. However, to avoid causing frequency excursions on transmission grids, plants must ensure that supply is equal to demand by offloading surplus electricity. In some states, this is performed by charging negative wholesale rates for electricity, thereby paying consumers to use additional electricity. This practice reduces the profitability of the generating plant. In some locations, production from renewable sources is curtailed, requiring operators to reduce generation far below capacity to avoid causing frequency excursions on the grid, effectively throwing out power. This, too, reduces profitability and incentives to build and to integrate renewable power generation sources.

Methods and systems that provide a profitable way to consume excess electricity are desired. Further, electric power producers desire methods and systems to quickly and responsively change consumption of excess electric power generated in order to meet consumer demand while maintaining cost-effective levels of operation, maintaining high capacity utilization, reducing pollution, and avoiding or reducing the increased cost and risk of equipment damage from rapid startup of power plants.

SUMMARY

In one disclosed embodiment, a computer-implemented method for controlling power delivered to a grid is disclosed. The method of the embodiment utilizes an interruptible load that is operated in accordance with the results of analysis of a number of parameters to determine efficient operation of both the power generation facility and the load. The method includes determining a market value of a unit of electricity sold on the grid, a production cost of the unit of electricity, a fuel cost required to produce the unit of electricity, a cost to sell fuel, a market value of a processing task requiring the unit of electricity, and a cost of starting the processing. The method includes calculating, as a net market value of the unit of electricity, a first difference between the market value of the unit of electricity and the production cost of the unit of electricity; calculating, as a net market value of the processing task, a second difference between the market value of the processing task and a sum of the production cost of the unit of electricity and the cost of starting the processing; and calculating, as a net market value of the fuel, a third difference between the fuel cost and the cost to sell fuel; and calculating which of the net market value of the unit of electricity, the net market value of the processing task, and the net market value of fuel is highest. The method further includes shutting off an interruptible load, corresponding to the processing task, when the net market value of the unit of electricity is highest or the net market value of the fuel is highest; and starting a pending process corresponding to the processing task when the net market value of the processing task is highest.

Embodiments of the method and system of the present disclosure are described in relation to operation of power generation facilities. The methods and systems disclosed also apply to power purchased from other producers or obtained from alternative sources of electric power, including without limitation the spot market or resellers. Thus, the methods and systems disclosed relating to power production, fuel cost, and related variables apply to comparable variables relating to power obtained from other sources.

BRIEF DESCRIPTION OF THE DRAWINGS

The accompanying drawings, which are incorporated in and constitute part of this disclosure, together with the description, illustrate and explain the principles of various exemplary embodiments of the disclosure.

DETAILED DESCRIPTION

Figure 1:
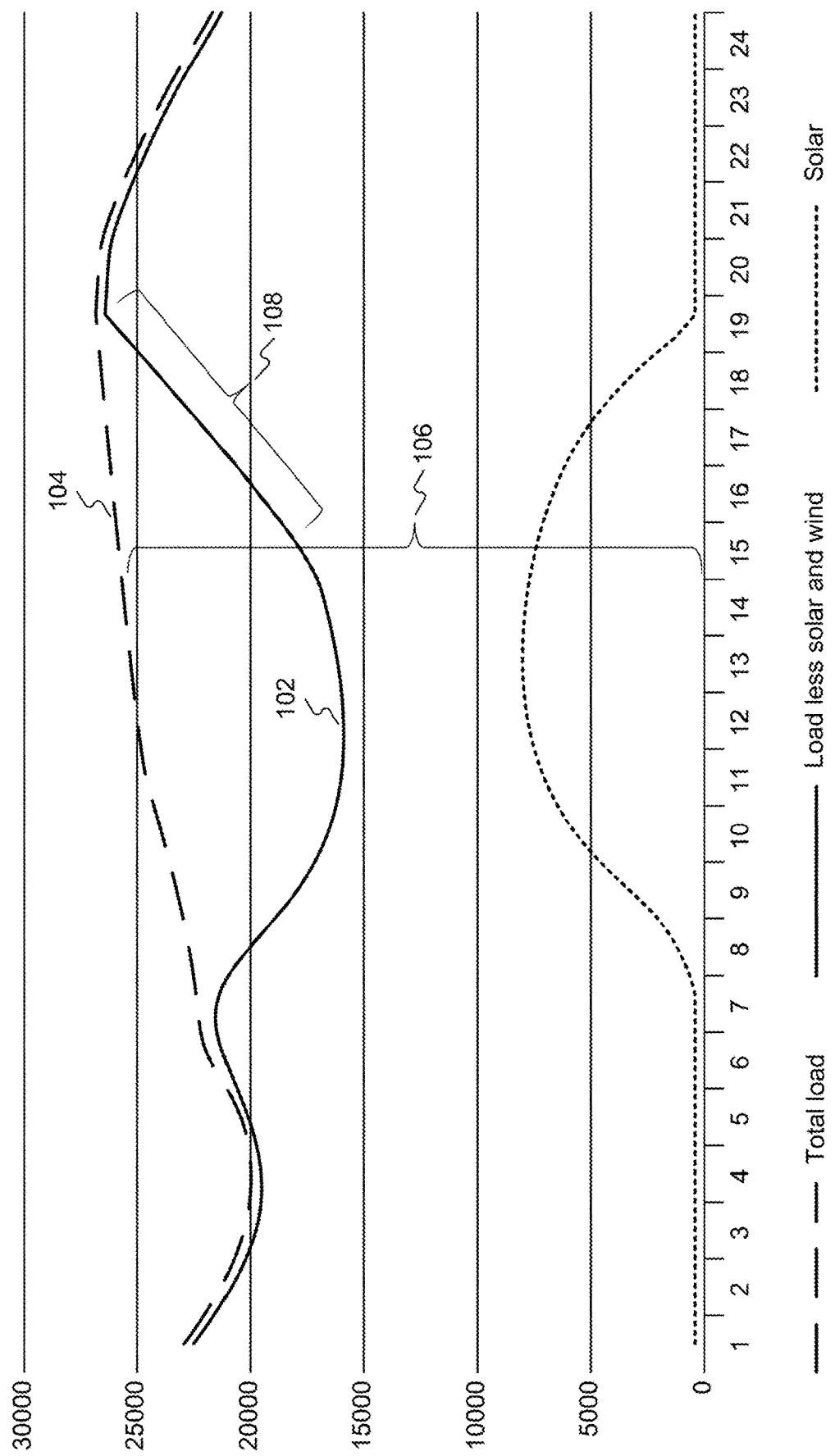
FIG. 1 is a graph illustrating representative values of total load, load less solar and wind power contribution, and solar power production, on a power grid throughout a typical day. The values provided are illustrative and representative only and not intended to convey precise values.

Reference will now be made in detail to the example embodiments implemented according to the present disclosure, the examples of which are illustrated in the accompanying drawings. Wherever possible, the same reference numbers will be used throughout the drawings to refer to the same or like parts.

The present disclosure arises from the realization that electrical production costs including power plant startup operations, electric transmission and distribution fees, and regulatory costs, including curtailment and demand charges, as well as introduction of renewable energy sources, may impair or prevent optimized operation of power generating plants. The present disclosure proposes methods and systems to optimize power plant generation by activating an interruptible load, such as processing resources, to consume excess electricity and produce marketable commodities, allowing power plants to operate more economically at higher capacity utilization. An interruptible load may be a load that may be shut off or reduced on demand without breaching an expectation of reliable service. The present disclosure proposes methods and systems to enable quicker response to changes in consumer electrical demands by rapidly shutting off an interruptible load running these processes while a power plant generates electricity at optimal output, freeing electricity for delivery to the grid for any consumption without causing transient power plant operations. Further still, the present disclosure proposes methods and systems to precisely consume electricity so as to avoid regulatory penalties, poor capacity utilization, and transmission costs. Additionally, in some embodiments, additional grid services such as frequency control, voltage control, and voltage-ampere reactive (VAR) controls may be serviced. For example, by altering the power draw of an interruptible load, an operator may more easily maintain a desired alternating current frequency delivered to customers.

The disclosed embodiments include computer-implemented methods and tangible non-transitory computer-readable media. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored.

Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

The embodiments disclosed herein include systems that are operated by the computer-implemented methods. Such systems may include, for example, facilities, factories, warehouses, hardware, power plants, renewable energy farms, storage tanks, pipelines, and computer networks. Additionally, systems disclosed herein may include a memory and processor configured to perform operations including the disclosed methods.

FIG. 1 illustrates power plant production levels needed to meet consumer electrical demand over a 24-hour period. Power plant production is indicated by line 102, while actual load is indicated by line 104. As illustrated, actual load increases throughout a day. However, renewable electricity production, such as solar or wind, also contributes electricity to meet the actual load. Thus, despite rising demand throughout a day, generation by renewable energy sources, in particular, solar energy, causes reduced demand for conventional power during midday, illustrated as load and production difference 106. In the present example, solar power produces electricity during mid-day, between approximately 11:00 A.M. and 4:00 P.M. Beginning at approximately 4:00 P.M., solar power production decreases with the setting sun. At around this time, workers return home and begin energy-intensive activities, such as bathing, cooking, cleaning, heating and cooling, or charging an electric vehicle. The effect of a sharp decrease in solar production, combined with an increase in consumer demand, results in the steep increase in power plant production 108 needed to meet consumer demand during the evening hours. As illustrated in FIG. 1, the demand may require an increase of power output of roughly three thousand megawatts per hour for several hours.

In some situations, the equivalent of multiple power plants may need to be activated to meet consumer demand. This added capacity may only be needed for a few hours each day to meet the rising electrical demand between 4:00 P.M. and 8:00 P.M. The supplemental generating machinery then remains idle for twenty hours each day, preventing plant operators from recouping baseline operating costs and capital investments of a power plant, such as inefficient startup operations, maintenance, and employee costs, with more efficient operations outside of the startup period. Alternatively, power generating plants may operate at a suboptimal capacity utilization during the rest of the day in order to have adequate capacity during peak hours, thus increasing the cost of installing a plant, delaying plant payback, and reducing profitability.

Further, power plants are sometimes required to operate at a minimum emissions-compliant limit. When operating a reduced capacity, power plants may not optimally combust fuel, or may not reach catalytic temperatures necessary to decompose pollutants. For nuclear power plants, output may remain at a roughly constant level to increase safety and reduce risks due to power transients. Therefore, due to regulations, power plants may be unable to reduce output below a threshold. In such situations, power companies may sell electricity to consumers at a reduced or even negative rate, sometimes effectively paying customers to accept excess power generation so that power plants may operate at a more efficient capacity utilization and remain above their respective minimum allowable operating levels. Although paying for users to consume excess electricity is undesirable, a power company may do so to meet regulatory limits and reduce maintenance or improvement costs due to strain from excess power on the grid or strain from startup and shutdown operations at a power plant.

Further, renewable generation plants may be forced to curtail production to prevent grid frequency excursions or grid capacity constraints. For example, if a traditional power plant cannot decrease output to less than a certain proportion of total capacity due to safety requirements, minimum stable power production requirements, and regulations, a wind farm supplying the same grid may be required to stop electricity production entirely on a windy day so as to not overload a grid. This wastes power production opportunity and reduces profitability of renewable electricity generation, and inhibits investment in new technologies.

Figure 2:
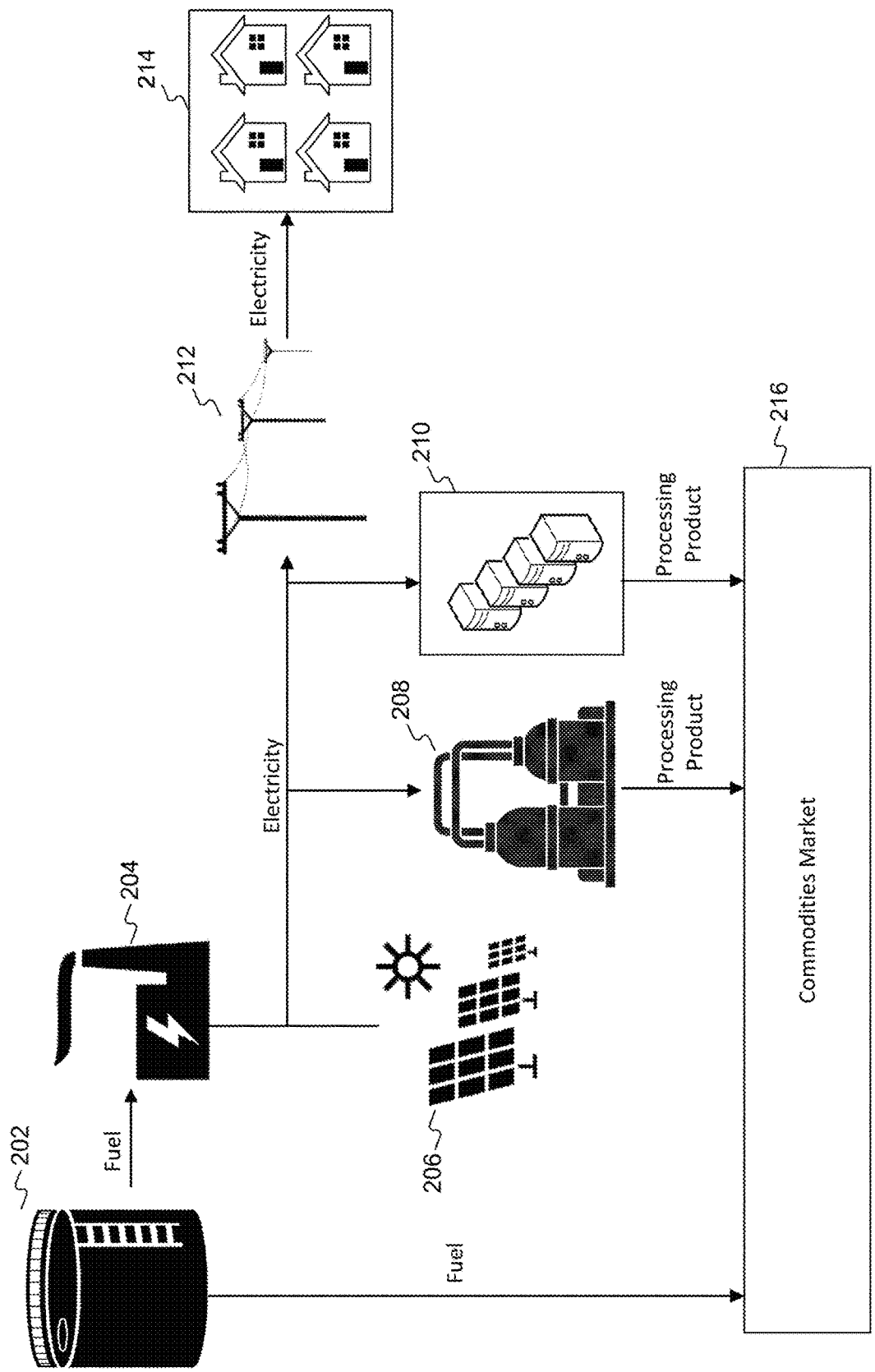
FIG. 2 is a diagram illustrating the flow of fuel, electricity, and processing products, consistent with the present disclosure.

FIG. 2. illustrates an exemplary flow of fuel, electricity, and processing products. Fuel storage 202 provides fuel, such as coal, oil, natural gas, or nuclear fuel, to a power plant 204. Alternatively, a plant operator may decide to resell fuel on a commodities market 216. For instance, the value of the fuel on the market may be higher than the value of electricity produced by the fuel, such as during fuel shortages or severe weather conditions in other locations. In some situations, the fuel may be transported, such as via pipeline or rail. Fuel may be sold for future delivery without physically transporting the fuel to the initial buyer, such that a plant in Chicago with a contract to take delivery of natural gas in Mississippi may sell the right to the fuel to a powerplant in Biloxi, without the Chicago plant ever actually having received physical delivery of the natural gas.

Fuel is provided to power plant 204, which, along with renewable generation sources 206, produces electricity. The electricity may be used to operate a processing plant 208 to produce a tangible commodity. For example, processing plant 208 may operate electrolyzers to produce hydrogen and oxygen for sale on a commodities market for bottled gasses. Processing plant 208 may also be a pumped storage facility, operating pumps to move water to a high retention facility to create electricity at a later time by flowing over a turbine, or by storing electricity directly in battery storage banks. The stored electricity may then be sold on a market 216, for example, on the same grid to which the power generating plant supplies power.

Electricity from power plant 204 and renewable generation 206 also supplies computational resources 210. Computational resources 210 may include, for example, supercomputer hardware configured to perform parallel processing, train neural networks, or run computer models such as protein folding, computational fluid dynamics, AI training protocols, particle physics transport, or any other appropriate computational task. Computational resources may also include application-specific integrated circuits (ASICs) or graphical processing units (GPUs). ASICs and GPUs may be configured to optimize cryptocurrency mining. For instance, computational resources 210 may host ASICs designed to mine a cryptocurrency. In some embodiments, computational resources 210 may include a plurality of hardware types configured for different purposes, such as mining a plurality of cryptocurrencies. Mined cryptocurrency may then be traded for value, government-issued currency, or other cryptocurrencies on a commodities market 216, such as a cryptocurrency exchange.

In some embodiments, processing plant 208 and computational resources 210 may be connected to an electricity source in advance of grid 212. For example, processing plant 208 and computational resources 210 may be connected between the output of power plant 204 and a step up transformer or grid interconnect point that conditions power from power plant 204 for delivery to consumers 214. In some embodiments, processing plant 208 and computational resources 210 may be constructed physically close to a power generation source. Alternatively, processing plant 208 and computational resources 210 may be constructed far from a power generation source, but still connected to a power generation source between an output and a step up transformer or grid interconnect point. Electricity consumed by the processing plant 208 and computational resources 210 may avoid transmission and delivery fees incurred for delivery of electricity downstream of a grid interconnect. Other transaction costs may also be reduced, and demand fees or curtailment requirements may be avoided, because electricity is not transferred to the grid 212.

Further, in some embodiments, processing plant 208 and computational resources 210 may comprise systems that can be rapidly shut down and rapidly restarted with no or little damage to components or degradation of processing products. For example, if processing plant 208 includes an electrolyzer, the electrolyzer may be turned off in seconds or minutes without damaging the electrolyzer. Further, all oxygen and hydrogen may be secured by quickly closing valves, without the oxygen and hydrogen degrading during the time the power is switched off. Additionally, if computational resources 210 include ASICs for bitcoin mining, a mining operation may be cut off mid-process without loss of previously-mined bitcoin, which is recorded in the bitcoin blockchain or quickly sold for value. In some embodiments, processing plant 208 and computational resources 210 may comprise an uninterruptible power supply which provides enough stored electricity to allow safe shutdown of a process, or to complete a task. For example, in the scenario of bitcoin mining, the likelihood of mining a block in the blockchain and collecting a reward for doing so may increase with time spent working on a current block, such that as more time elapses, the block is more likely to be mined. Shutting down computational resources may therefore include a determination of the likelihood of solving a block that is currently being processed. Components in processing plant 208 and computational resources 210 may be individually controlled, so that power consumption rises or declines to match available excess power.

Additionally, grid 212 transmits power to consumers 214. Consumers may be industrial, commercial, or residential. Different consumers may pay different rates per unit of electricity, such as a retail rate for residences, and a wholesale rate for industry.

Thus, as illustrated in FIG. 2, an operator may control power production and pre-grid electrical consumption to take advantage of commodity markets 216 for alternative products, while avoiding or minimizing transmission and delivery charges and other penalties, and optimizing power plant use. Further, an operator may reduce plant production and sell excess fuel to other consumers, increase processing plant 208 and computational resources 210 operation to absorb excess production, or reduce consumption by processing plant 208 and computational resources 210 to meet consumer demand and prevent blackouts or take advantage of higher electrical prices during peak usage times. The operator may meet rapidly climbing consumer demand by quickly shutting down processing, freeing additional power for consumers 214 while avoiding costly operation transients in power plant 204 and enabling power generation plant to operate at a more optimal capacity utilization level.

Figure 3:
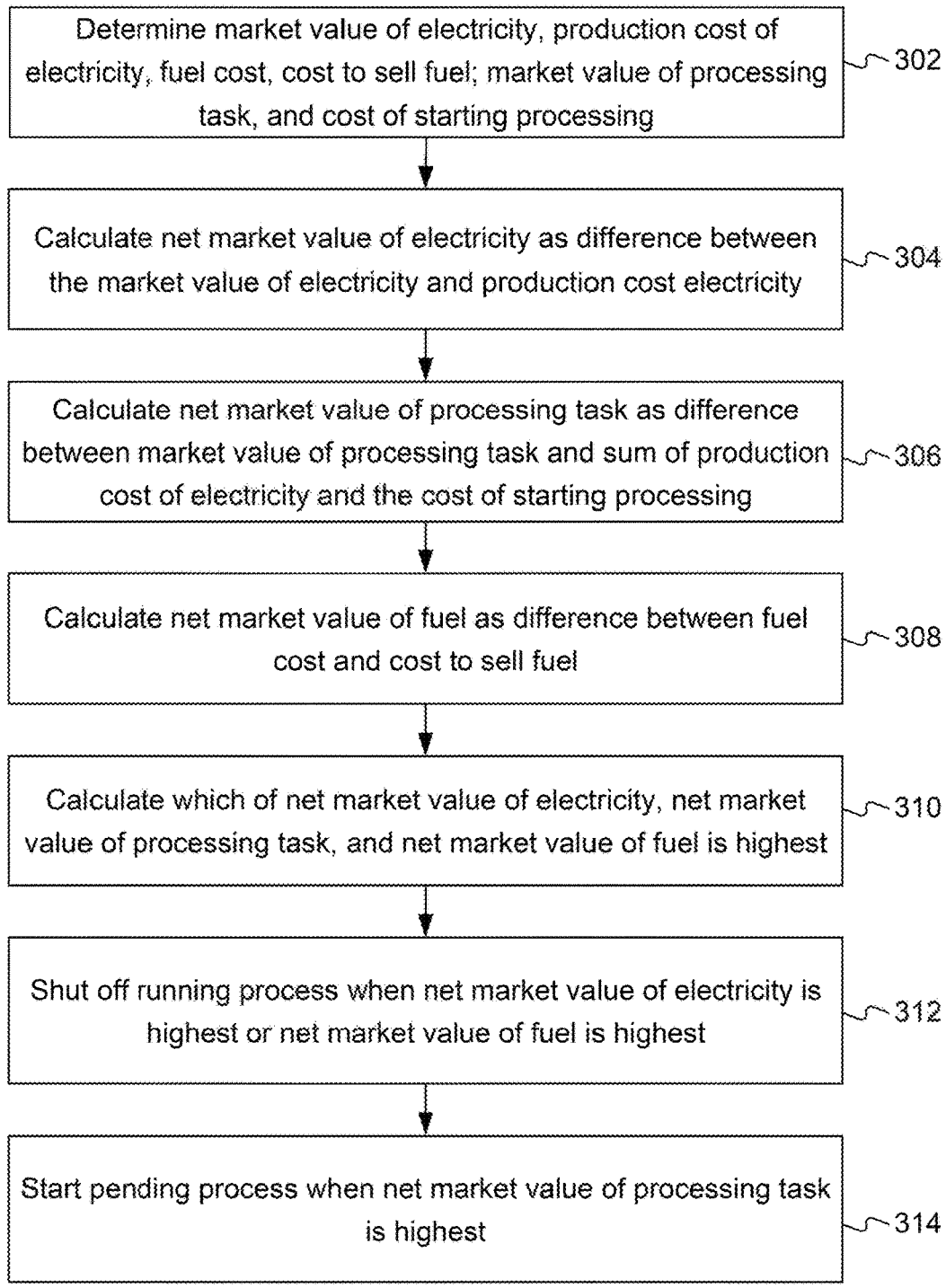
FIG. 3 is a flowchart of an example process for controlling power delivered to a grid, in accordance with embodiments of the present disclosure.

FIG. 3 illustrates an exemplary process 300 for controlling power delivered to a grid, in accordance with embodiments of the present disclosure. Step 302 includes determining a plurality of values for different commodities. For example, a product of a processing task may be a commodity sold on an exchange, such as raw materials or cryptocurrencies, such that a purchaser is identified after the product is created, and the purchaser may acquire the commodity from any of a plurality of suppliers. The product may be non-perishable, such as purified gasses, computational results stored in non-volatile memory, or stored electricity. Step 302 determines a market value of a unit of electricity sold on the grid, a production cost of the unit of electricity, a fuel cost required to produce the unit of electricity, a cost to sell fuel, a market value of a processing task requiring the unit of electricity, and a cost of starting the processing. Step 302 may include accessing websites, or other available sources, to determine market values of various items.

Step 304 includes calculating, as a net market value of the unit of electricity, a first difference between the market value of the unit of electricity and the production cost of the unit of electricity. Net market value may represent the profit gained by selling an item, such as the difference between the sale price and the sum of production cost, employees, financing, equipment, amortization, and raw materials. The production cost may include amortized maintenance and financing on an electrical production facility (such as a power plant or solar farm). Production cost may also include wages for operators. In some embodiments, the market value of the unit of electricity sold includes at least one of energy production charges, demand charges, and transmission and distribution charges. The unit of electricity sold may be sold on the grid to consumers. Further, consumer type may vary between wholesale and retail, and so an average market value may be used. Alternatively, models may be employed to determine the most profitable mix of wholesale and retail, or power may be sold at only wholesale rates, or only retail rates. Production cost may also include taxes and regulatory fees. In some embodiments, electricity may be traded between markets or producers. For example, an electricity producer may trade electrical production required to meet renewable energy requirements, or may also trade renewable energy credits. Additionally, an electricity producer may trade energy options or futures. In these embodiments, transaction fees, such as dealer or exchange fees, may also be considered. For example, step 302 may include determining a purchase value of a futures contract for electricity, and step 304 may include calculating, as a net market value of the unit of electricity, a difference between the market value of the unit of electricity and a proportion of the futures contract corresponding to the unit of electricity.

Step 306 includes calculating, as a net market value of the processing task, a second difference between the market value of the processing task and a sum of the production cost of the unit of electricity and the cost of starting the processing. The cost of starting the process may include electricity consumed while starting the process but not yet producing a product, or expected equipment damage from the startup, such as consumable switches and breakers, failure of electronic components, or cyclic fatigue of mechanical parts.

Additionally, in some embodiments, the energy cost associated with the processing task comprises energy production charges. In other words, the cost of electricity provided to the process may be lower than the cost of electricity provided to consumers because the process may consume electricity upstream of transformers and interconnects, thereby avoiding demand charges, transmission and distribution fees, taxes, and fees, and may avoid electrical losses that would otherwise be incurred in the transmission and distribution systems. Alternatively, the energy cost associated with the processing take may also include the same types of costs of providing electricity to consumers, but individual costs may be the same or differ from those charged to consumers. Further, step 306 may include calculating a difference between the market value of the processing task and the proportion of the futures contract corresponding to the unit of electricity.

Step 308 includes calculating, as a net market value of the fuel, a third difference between the fuel cost and the cost to sell fuel. The fuel cost may vary depending on quantity of fuel sold to another party, for instance. The cost to sell fuel may also vary on the quantity, as well as any brokerage fees increasing transaction cost.

Step 310 includes calculating which of the net market value of the unit of electricity, the net market value of the processing task, and the net market value of fuel is highest. Other factors affecting a net market value, such as regulatory fees or taxes, may also be calculated and incorporated into the calculation of step 310. Step 310 may include compare the net market value of the unit of electricity and the net market value of the processing task, disregarding the net market value of fuel.

Step 312 includes shutting off a running process corresponding to the processing task when the net market value of the unit of electricity is highest or the net market value of the fuel is highest. Step 312 may shut off a portion of all running process, such that step 312 gradually shuts down a running processes by selectively removing power to components. Step 312 may sever power to all components. Step 312 may further include a control mechanism, such as a proportional-integral-derivative (PID) controller, to calculate which components must be shut down to match reduction in power generation (such as when a cloud passes a solar farm or a steam turbine goes offline), or match an increase in demand (such as during evening hours), or to match a combined reduction and increase.

Step 314 includes starting a pending process corresponding to the processing task when the net market value of the processing task is highest. Step 314 may start a portion of total pending processes to gradually increase consumption of excess power, or to match increases in excess power consumption. Step 314 may incorporate a PID controller as described for step 312. In this way, step 314 directs excess power away from the grid into a more profitable use.

Step 312 and 314 may be performed in real-time, enabling responsive load transfer in conjunction with highly fluctuating production or consumption. Step 312 and 314 may also be performed based on an average demand over a period of time to avoid excessive startup periods that are unproductive but nonetheless consume electricity and damage components.

Further, process 300 may include reducing electricity generation at a power plant and selling fuel when the net market value of the fuel is highest. For instance, if an emergency in a first location damages fuel stores for power plants in the first location, power plants in a second location not affected by the emergency may reduce production and sell fuel to power plants in the first location at a profit. Similarly, a variety of operating conditions, routine maintenance, or system or equipment failures, could result in a comparable difference between two locations. In these situations, process 300 may initiate a sale automatically, or may identify the opportunity to an operator for approval. Additionally, the amount of fuel sold may be limited to ensure the sufficient fuel exists to maintain electricity generation above a minimum emissions compliant limit.

Additionally, process 300 may include purchasing electricity at a lower cost than cost of producing the same electricity. This may occur, for example, if one region has lower demand, and thus a lower electricity price, than another region. Process 300 may include determining if the market value of the unit of electricity sold on the grid is lower than a total operating cost comprising the production cost of the unit of electricity, a startup cost to start power generation, and a shut-down cost to stop power generation; determining a cost of purchasing electricity from a different electricity supplier; and purchasing electricity from the different electricity supplier if the cost of purchasing electricity is less than the total operating cost.

In some scenarios, overproduction of electricity may cause curtailment of production. For example, an operator of a wind power farm may need to reduce output by, for instance, altering wind turbine blade angle or braking turbine movement. In this situation, although there is no excess power, there is excess generating capacity which could be utilized to earn a profit and improve investment outcomes. Therefore, process 300 may further include determining if curtailment policies require a reduction in an amount of electricity delivered to the grid, for instance, below an optimal production capacity.

Process 300 may include starting the pending process to consume electricity generated in excess of limits imposed by curtailment policies. Alternatively, process 300 may start the pending process in conjunction with an increase optimization or increased production of renewable electrical production in order to prevent triggering of curtailment policies and any relates fees. In some embodiments, process 300 may also determine an expected profit derived from consuming electricity to avoid curtailment. That is, process 300 may also include determining a cost of curtailment fees, determining an expected maintenance cost incurred by operating during a curtailment period, and calculating a net market value of curtailment processing as a difference between the net market value of the processing task and a sum of the cost of curtailment fees and expected maintenance cost. Process 300 may also include starting the pending process to consume electricity generated in excess of limits imposed by curtailment policies when the net market value of curtailment processing exceeds a threshold.

In other alternatives, power generation may be stopped or shut down, and process 300 supplied electric power through back-feed of power from the grid, or an alternative source of power. Further, the operator may contract to have power delivered from an alternative source at any point on the grid providing the ability to trade power as needed and the methods and system disclosed may be used in these situations as well.

Figure 4:
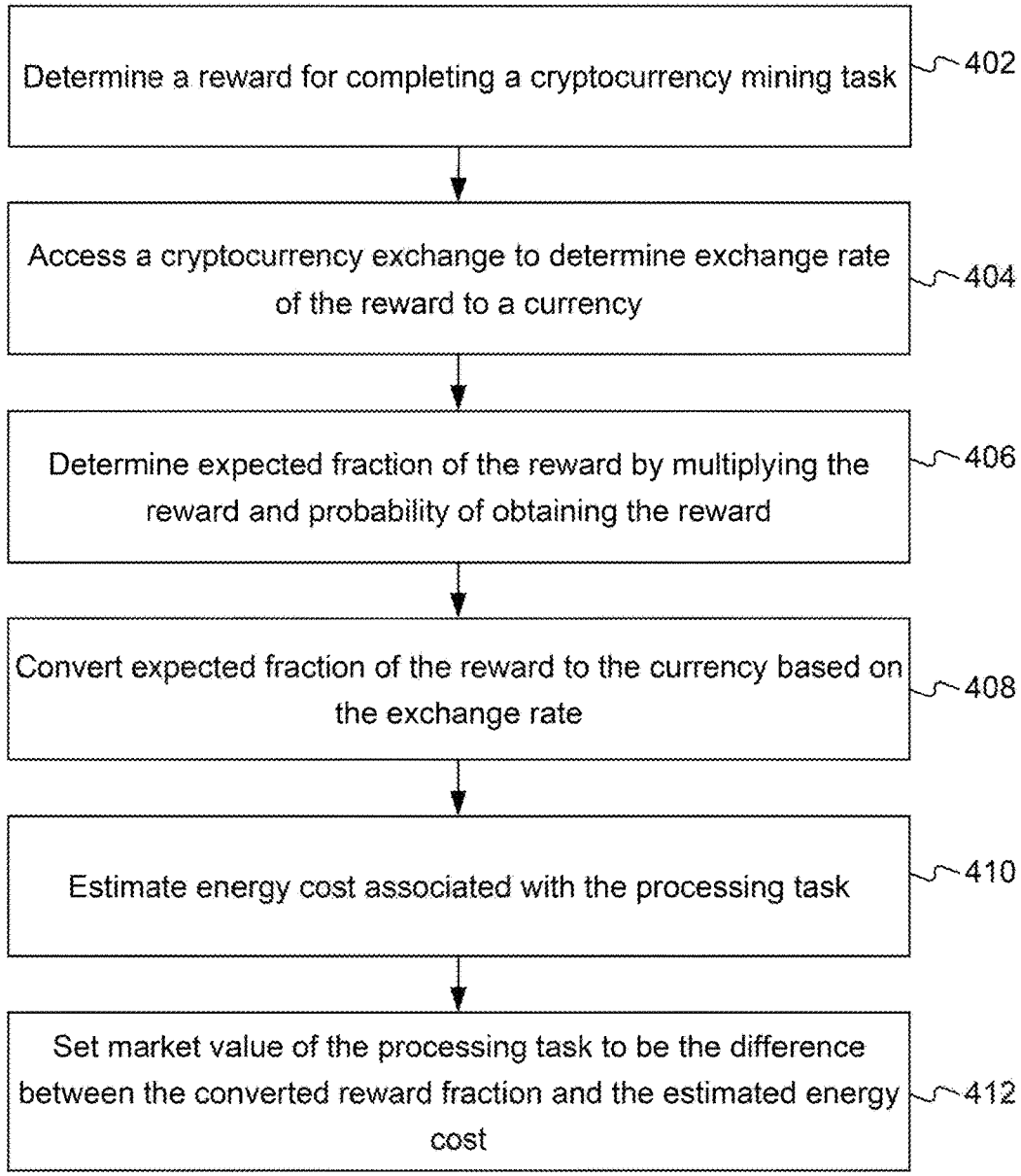
FIG. 4 is a flowchart of an example process for determining a processing task having a highest value, in accordance with embodiments of the present disclosure.

FIG. 4 illustrates an exemplary process 400 for determining a processing task having a highest value, in accordance with embodiments of the present disclosure. The processing task may include cryptocurrency mining. Step 402 of process 400 includes determining a reward for completing the cryptocurrency mining task. For instance, if the process includes bitcoin mining, the reward may be newly minted bitcoin, provided upon determining a nonce value for a block. Step 404 includes accessing a cryptocurrency exchange to determine an exchange rate of the reward to a currency. The currency may be government-backed, such as dollars or euros, or a different cryptocurrency, or another form of valuable consideration.

Step 406 includes determining an expected fraction of the reward by multiplying the reward and a probability of obtaining the reward. For example, in the case of bitcoin mining, a bitcoin block is mined and a reward issued approximately every ten minutes. If an ASIC starts mining five minutes after the previous block was mined, the likelihood of the ASIC mining the next block is halved. Additionally, the likelihood of the ASIC mining the next block corresponds to a fraction of the ASIC hashing rate and the total hashing capability of the bitcoin network. In some embodiments, processing power may be joined to other processors in a pool which distributes fractions of the reward to members of the pool according to the fraction of total processing provided to the pool, allowing a consistent, but lower, reward. In this case, step 406 may further determine a reward by subtracting any pool fees.

The time to mine a block varies, and may be more than an hour, although the bitcoin network targets a new block being mined approximately every ten minutes. In some embodiments, the amount of time elapsed past the target time, or an amount of time elapsed since a previous block was mined, may be used to determine the likelihood that a new block will be mined in a subsequent time interval. Block mining times may be arranged in a distribution of past mining intervals and modeled as a Poisson distribution or an exponential distribution, having a mean, for instance, of 10 minutes. With this information, the likelihood of a block being mined in the next minute given that the last block was mined twenty minutes ago may be calculated. This likelihood may be included in a determination of shutting down or continuing processing, for instance, by being incorporated into an expected profit by multiplying the reward value by the likelihood.

Step 408 includes converting the expected fraction of the reward to the currency based on the exchange rate. Further, step 410 includes estimating an energy cost associated with the processing task. For instance, step 410 may estimate cost based on the amount of time remaining until a reward is issued. Step 412 includes setting the market value of the processing task to be the difference between the converted reward fraction and the estimated cost.

Further, the processing task may include a computational task required by, for instance, researchers. The processing task may include a computational model or neural network training operation configured to operate intermittently at least by saving progress while the processing task is operating. For example, if a researcher is training a neural network, weights for each neuron in the neural network may be stored in a non-volatile memory so that if a power supply is severed, training may quickly resume with no lost progress once power resumes. In this way, a researcher who does not require uninterrupted processing may benefit from cost savings available due to cheaper electricity, while the power generator may benefit from greater capacity use. For example, an algorithm may receive an input that an operator wants to shut down processing, and the algorithm may suggest an approval or disapproval in accordance with financial impacts of shutting down and the time frame.

In some embodiments, process 400 may further include determining a market value for each of a plurality of processing tasks. For example, process 400 may determine the market value of a plurality of cryptocurrencies. Process 400 may also include setting the pending process to be the processing task among the plurality of processing tasks having a highest market value. For example, process 400 may calculate the expected amount of time and dollar value of the reward to mine bitcoin and Ethereum, as well as respective electricity costs and any incurred fees, such as pool fees or transaction fees. Process 400 may then designate the most valuable cryptocurrency as the pending process that will start when its value is highest. Further, process 400 may start the pending process by starting hardware optimized to perform the pending process, and shut off hardware optimized to perform tasks other than the pending process. For example, if etherium is the highest value, process 300 may start GPUs designed to mine Ethereum and shut down ASICs for bitcoin mining, or let them remain idle if they are not operating.

Figure 5:
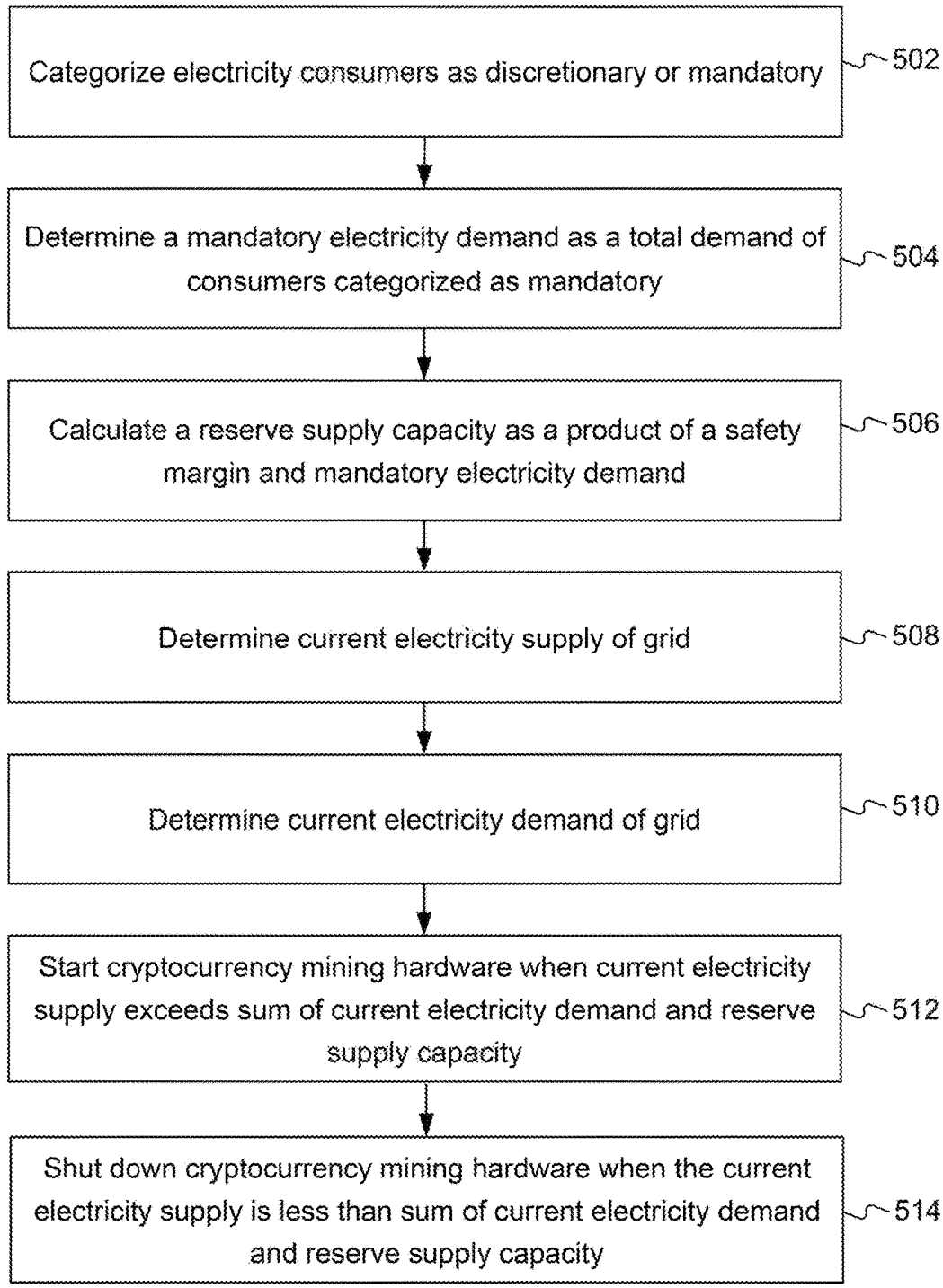
FIG. 5 is a flowchart of an example process for prioritizing electricity delivery, in accordance with embodiments of the present disclosure.

FIG. 5 is a flowchart of an exemplary process 500 for prioritizing electricity delivery, in accordance with embodiments of the present disclosure. At times, selling electricity to the grid may not present the highest value. Yet, supplying increased electricity to consumers at time of increased demand may be necessary to prevent blackouts or brownouts. Thus, in some embodiments, electricity may be provided to consumers even though selling fuel or using the electricity to mine cryptocurrency or produce a commodity is more valuable.

Process 500 may be used to ensure that essential services, such as hospitals, high priority services, such as commercial facilities, industry, and homes, and discretionary services, such as energy storage, receive electricity according to priority. This may, for example, decrease the risk of blackouts or brownouts. Further, by controlling a discretionary but profitable load using process 500, an electricity provider may ensure sufficient capacity exists to meet consumer needs by operating at electrical production at full capacity and using excess production to recoup investment and maintenance costs and avoiding lost productivity.

Step 502 includes categorizing electricity consumers as discretionary or mandatory. For example, hospitals, nursing homes, air traffic control, water supply, and transportation may be identified as mandatory consumers, while movie theaters, malls, and warehouses may be identified as discretionary. Mandatory loads may also have a backup generator or electricity storage for added redundancy. Step 504 includes determining a mandatory electricity demand as a total demand of consumers categorized as mandatory. Step 506 includes calculating a reserve supply capacity as a product of a safety margin and the mandatory electricity demand. For example, the method and system may maintain a threshold production capacity or preset margin above a threshold production capacity so that spikes in usage will not result in a power outage for certain functions.

Step 508 includes determining a current electricity supply of the grid, and step 510 includes determining a current electricity demand of the grid. In some embodiments, supply and demand of a portion of a grid may be analyzed. Process 500 thus monitors electricity demand of consumers using the grid.

Step 512 includes starting cryptocurrency mining hardware when the current electricity supply exceeds the sum of the current electricity demand and the reserve supply capacity. In other words, if consumer demand and reserve supply are met, and supply equals demand, step 512 may start cryptocurrency hardware to utilize surplus capacity. In some embodiments, step 512 may also increase electrical production if surplus capacity exists, allowing more cryptocurrency mining hardware to start.

If processing plant 208 or computational resources 210 are in operation, the running process may be shut off when the sum of electricity demand and electricity use by the running process exceeds electricity supply. Thus, step 514 includes shutting down cryptocurrency mining hardware when the current electricity supply is less than the sum of the current electricity demand and the reserve supply capacity. Step 514 may also increase electrical production, or may maintain electrical product and create additional supply by reducing the load caused by cryptocurrency mining hardware.

In other words, process 500 may include operating a power plant at a constant production level and shutting off a running process or starting a pending process such that electricity delivered to the grid matches consumer electricity demand. In this way, process 500 may "throttle" delivery to the grid by controlling pre-grid consumption rather than by changing power plant operation, enabling the power generation facility to operate at a more favorable capacity utilization level.

In the preceding disclosure, various example embodiments have been described with reference to the accompanying drawings. It will, however, be understood by persons skilled in the art that various modifications and changes may be made thereto, and additional embodiments may be implemented, without departing from the broader scope of the disclosure as set forth in the claims that follow. The disclosure and drawings are accordingly to be regarded as illustrative rather than restrictive. For example, the present disclosure illustrates various methods of managing electric power production. The methods and systems disclosed also apply to power that is purchased from other producers or from alternative sources of electric power, including without limitation the spot market or resellers. Thus, the methods and systems disclosed relating to power production, fuel cost, and related variables should be understood to apply as well to comparable variables relating to power obtained from other sources.

Therefore, it is intended that the disclosed embodiments and examples be considered as examples only, with a true scope of the present disclosure being indicated by the following claims and their equivalents.

The invention claimed is:

1. A computer-implemented method for controlling power consumption comprising:
  selecting an interruptible processing task adapted to produce a product;
  determining a value of a unit of electricity and a market value of the product of the interruptible processing task requiring at least one unit of electricity;
  calculating a difference between the market value of the product of the interruptible processing task and the value of electricity required to execute the interruptible processing task;
  starting the interruptible processing task when the market value of product of the interruptible processing task is higher than the value to an operator of the interruptible process of the electricity required to execute the interruptible processing task;
  continuing an interruptible processing task when the market value of the product of the interruptible processing task is higher than the value to the operator of the interruptible process of the electricity required to execute the interruptible processing task; and
  curtailing the processing task when the value of the electricity required to execute the interruptible processing task is higher than the market value of the product of the interruptible processing task.

2. The method of claim 1, wherein:
the processing task comprises cryptocurrency mining and the product of the interruptible processing task comprises a reward for completing a cryptocurrency mining task; and
determining the market value of the product of the interruptible processing task comprises:
  determining a reward for completing the cryptocurrency mining task;
  accessing a cryptocurrency exchange to determine an exchange rate of the reward to a currency;
  determining an expected fraction of the reward by multiplying the reward and a probability of obtaining the reward;
  converting the expected fraction of the reward to the currency based on the exchange rate;
  estimating an energy cost associated with the interruptible processing task; and
  setting the market value of the interruptible processing task to be the difference between the converted reward fraction and the estimated energy cost.

3. The method of claim 2, wherein:
the market value of the unit of electricity comprises at least one of energy production charges, demand charges, and transmission and distribution charges; and
the energy cost associated with the processing task comprises energy production charges.

4. The method of claim 2, wherein the probability of obtaining the reward comprises:
a likelihood that a block of a blockchain will be mined within a time interval;
the likelihood being based on a distribution of past mining intervals;
a target mining time; and
an amount of time of elapsed since a previous block was mined.

5. The method of claim 1, further comprising:
determining a market value for each of a plurality of interruptible processing tasks;
selecting the interruptible processing task among the plurality of interruptible processing tasks having a highest market value; and
starting the interruptible processing task comprises:
  starting hardware optimized to perform the interruptible processing task; and
  shutting off hardware optimized to perform tasks other than the interruptible processing task.

6. The method of claim 1, wherein:
curtailing comprises shutting down the interruptible processing task, in whole or in part.

7. The method of claim 1, further comprising:
determining a cost of purchasing electricity from an alternative electric power supplier; and
purchasing electricity from the different electricity supplier if the cost of purchasing electricity is less than a purchase value of a futures contract for electricity.

8. The method of claim 1, further comprising:
determining if curtailment policies require a reduction in an amount of electricity delivered to the grid; and
starting the interruptible processing task to consume electricity in excess of limits imposed by curtailment policies.

9. The method of claim 1, further comprising:
monitoring electricity demand of consumers using the grid; and
shutting off the interruptible processing task when a second sum of electricity demand and electricity use by the running process exceeds electricity supply.

10. The method of claim 1, wherein:
the interruptible processing task comprises a neural network training operation configured to operate intermittently at least by saving progress while the processing task is operating.

11. The method of claim 10, wherein the product of the interruptible processing task is an updated AI model or a new AI model.

12. The method of claim 10, wherein determining the market value of the product of the interruptible processing task comprises determining the market value of the updated AI model or the new AI model.

13. The method of claim 1, wherein the unit of electricity is assessed based on units of kilowatt-hours.

14. A system for managing power consumption, comprising:
a memory storing instructions; and
at least one processor configured to execute the stored instructions to:
  select an interruptible processing task adapted to produce a product;
  determine a value of a unit of electricity and a market value of the product of the interruptible processing task requiring at least one unit of electricity;
  calculate a difference between the market value of the product of the interruptible processing task and the value of electricity required to execute the interruptible processing task;
  start the interruptible processing task when the market value of the product of the interruptible processing task is higher than the value to an operator of the interruptible process of the electricity required to execute the interruptible processing task;
  continue an interruptible processing task when the market value of the product of the interruptible processing task is higher than the value to the operator of the interruptible process of the electricity required to execute the interruptible processing task; and
  curtail the processing task when the value of the electricity required to execute the interruptible processing task is higher than the market value of the product of the interruptible processing task.

15. A non-transitory computer readable medium having stored instructions that when executed cause at least one processor to perform instructions for managing power consumption, comprising:
selecting an interruptible processing task adapted to produce a product;
determining a value of a unit of electricity and a market value of the product of the interruptible processing task requiring at least one unit of electricity;
calculating a difference between the market value of the product of the interruptible processing task and the value of electricity required to execute the interruptible processing task;
starting the interruptible processing task when the market value of the product of the interruptible processing task is higher than the value to an operator of the interruptible process of the electricity required to execute the interruptible processing task;

continuing an interruptible processing task when the market value of the product of the interruptible processing task is higher than the value to the operator of the interruptible process of the electricity required to execute the interruptible processing task; and curtailing the processing task when the value of the electricity required to execute the interruptible processing task is higher than the market value of the product of the interruptible processing task.

16. A cryptocurrency mined by the method of claim 2, comprising:

determining a reward for completing a cryptocurrency mining task;

accessing a cryptocurrency exchange to determine an exchange rate of the reward to a currency;

determining an expected fraction of the reward by multiplying the reward and a probability of obtaining the reward;

converting the expected fraction of the reward to the currency based on the exchange rate;

estimating an energy cost associated with the cryptocurrency mining task; and setting the market value of the cryptocurrency mining task to be the difference between the converted reward fraction and the estimated energy cost.

* * * * *